Dec. 9, 1947.  W. T. CALDWELL  2,432,088
PRESSURE ACTUATED VALVE
Filed March 19, 1942  3 Sheets-Sheet 1
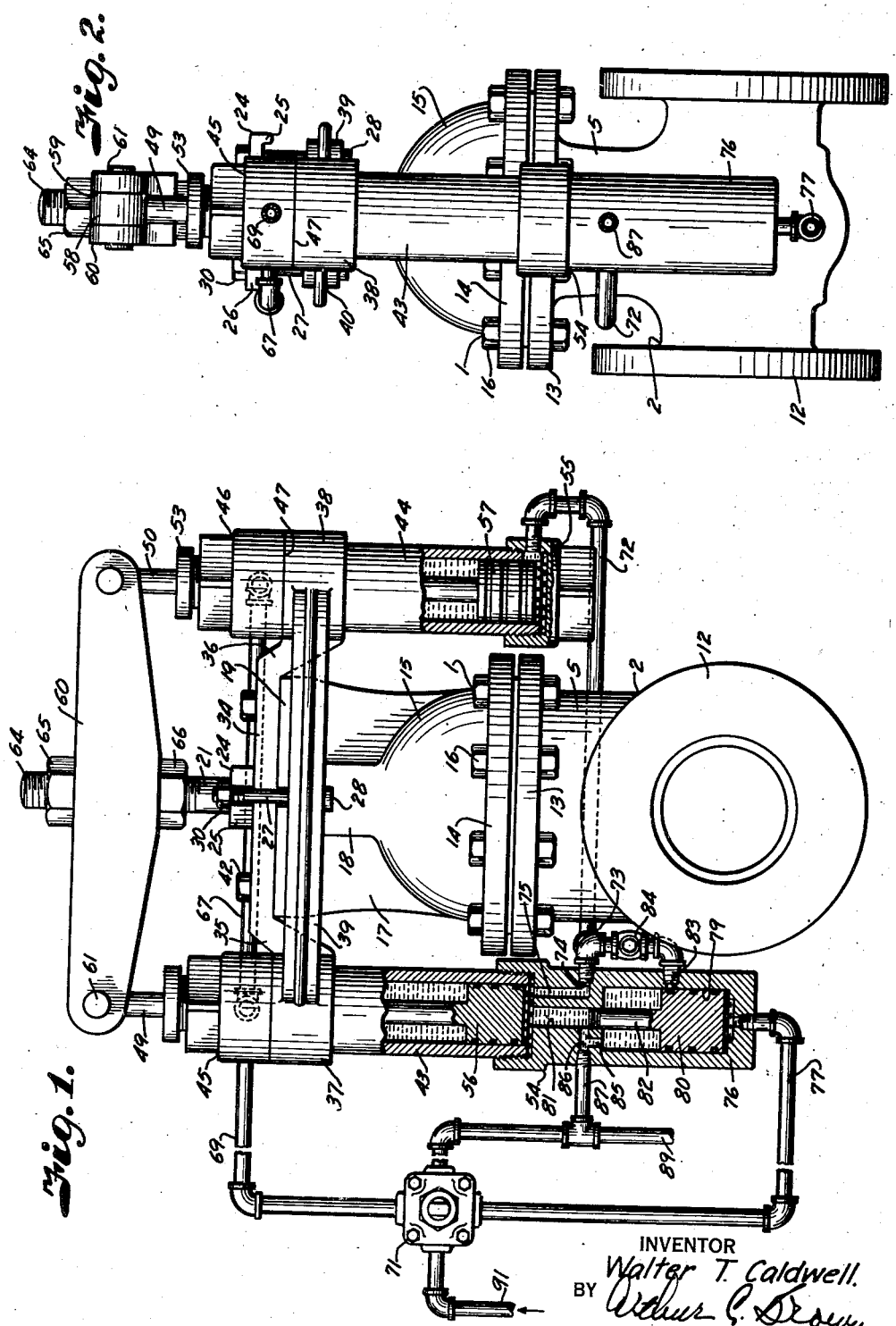
INVENTOR
Walter T. Caldwell.
BY
ATTORNEY Dec. 9, 1947.  W. T. CALDWELL  2,432,088
PRESSURE ACTUATED VALVE
Filed March 19, 1942  3 Sheets-Sheet 2

INVENTOR
Walter T. Caldwell.
BY
ATTORNEY

Dec. 9, 1947.  W. T. CALDWELL  2,432,088
PRESSURE ACTUATED VALVE
Filed March 19, 1942  3 Sheets-Sheet 3

INVENTOR
Walter T. Caldwell
BY
ATTORNEY

Patented Dec. 9, 1947

2,432,088

UNITED STATES PATENT OFFICE 2,432,088

PRESSURE ACTUATED VALVE

Walter T. Caldwell, Enid, Okla., assignor, by mesne assignments, to Valve Engineering Company, Enid, Okla., a corporation of Oklahoma Application March 19, 1942, Serial No. 435,306

15 Claims. (Cl. 137—139)

This invention relates to valves, particularly those of the type usually known as gate valves for controlling flow of fluids. Such valves usually consist of a body having a through passage for flow of fluid which is intercepted by a wedge-shaped disk or gate adapted to be moved transversely across the passageway and to and from wedging contact with opposed seating faces disposed in planes corresponding to the wedge of the disk. These seating faces are usually provided in the form of ring inserts of bronze or other relatively soft material to assure a tight fit with the gate when the valve is closed. With this construction considerable power is required to unseat the gate from wedging contact with its seats, particularly when the valve is handling fluids under high temperatures and/or pressures, but when the wedging effect is broken substantially less power is required to complete the opening movement and to effect subsequent closure of the gate. Therefore, when provision is made to operate these valves under mechanical power, the motive force of that power must be sufficient to unseat the disk. Consequently the required power is greatly in excess of that needed to complete the opening movement or to close the gate. Thus the power in excess of that required to complete opening movement acts in seating the gate and the gate is driven to its seat with excessive force and wedged tighter so that still greater power is required to effect the necessary initial opening of the disk. This must also be taken into account when designing the motive power. An excess of power must be provided which not only increases installation and operating costs but is destructive to the valve in that it causes galling of the seating faces and springing of the seat rings to such an extent that the valve will soon begin to leak.

This ill effect is aggravated in quick action power manipulated valves for the reason that the relatively heavy moving parts driven under excessive power produce destructive percussion forces upon seating of the disk in addition to the pressure forces.

It is, therefore, a principal object of the present invention to provide a variable power means for actuating the closure disk of a gate valve and whereby sufficient power is applied to effect unseating of the disk and then automatically reduced to that required for completing the opening movement and for reclosing the valve.

A further object of the invention is to provide a power means capable of effecting a relatively slow initial movement of the gate followed by a more rapid movement, thereby adapting the valve for quick action control of high pressure fluids as encountered in present day petroleum refinery processes.

Other objects of the invention are to provide a power actuated valve especially adapted for remote control thereof; to provide a power mechanism applicable to any existing gate valve structure; to provide a simple and relatively inexpensive power mechanism; to provide a power mechanism that is not likely to be disrupted should the valve operated thereby happen to stick; to provide a power mechanism under complete control of the operator whereby the actuating speed may be readily varied; to provide a relatively small, compact actuating mechanism which, when applied to a standard valve, does not increase the overall height thereof; to provide a remotely controlled actuated mechanism whereby the motive force is applied directly at the valve; and to provide a power mechanism capable of operation while submerged in fluids and relatively inaccessible places.

In accomplishing these and other objects of the invention, I have provided improved structure, the preferred form of which is illustrated in the accompanying drawings, wherein:

Fig. 1 is a front elevational view of a gate valve equipped with a power actuating mechanism embodying the features of the present invention, parts thereof being broken away to better illustrate the construction.

Fig. 2 is a side elevational view of the valve and its actuating mechanism.

Fig. 3 is a section through the valve showing the gate or disk thereof in closed position and parts of the actuating cylinders in elevation.

Fig. 4 is a central section through the valve taken at right angles to the section illustrated in Fig. 3, and showing the gate just as it clears its seat upon opening of the valve.

Figure 5:
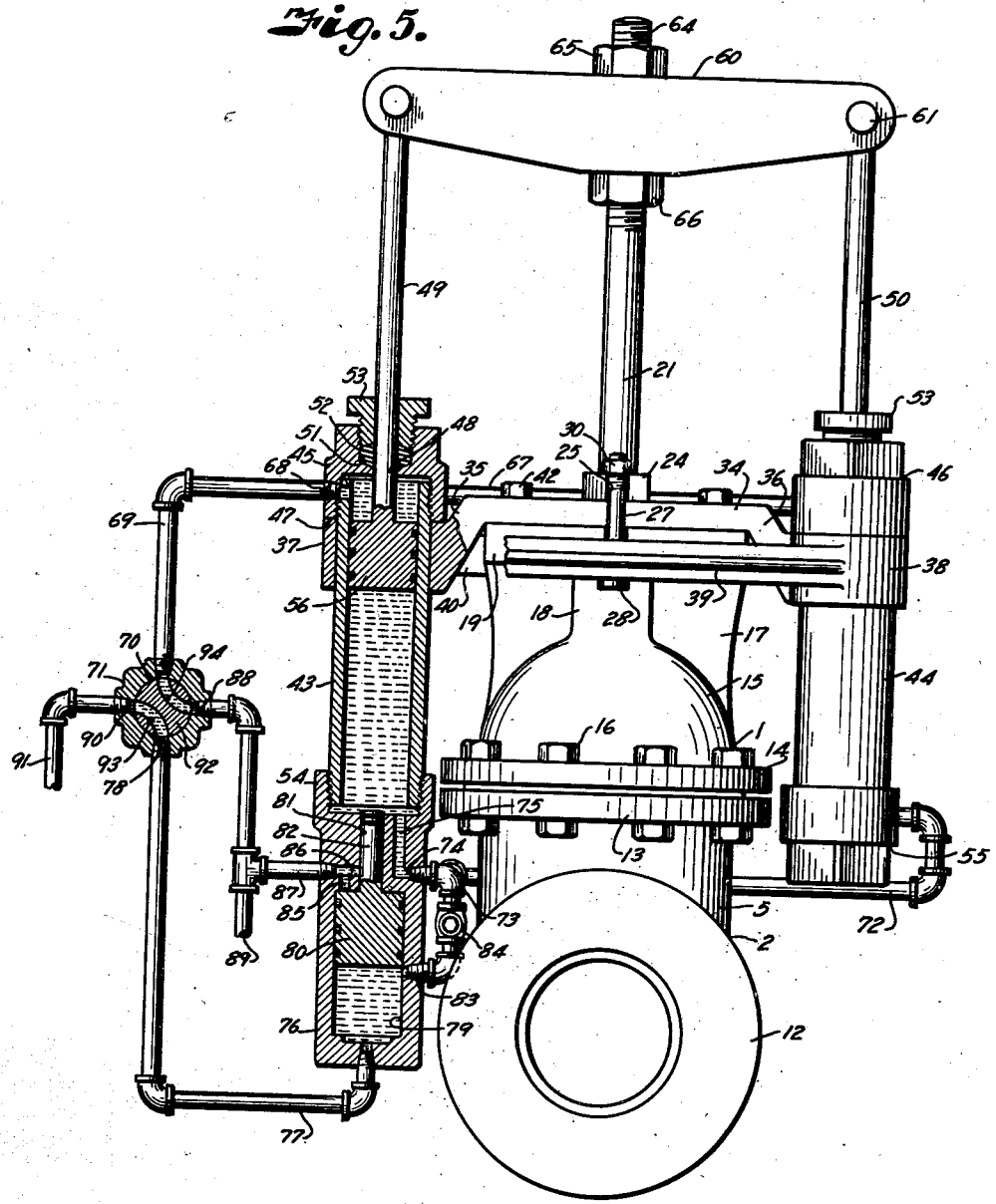
Fig. 5 is a view similar to Fig. 1, but showing the power actuating mechanism in full gate open position.

Referring more in detail to the drawings:

1 designates a gate valve including a body 2, having a flow passageway 3 therethrough intercepted by a transverse gate-receiving recess 4 extending upwardly into a lateral neck 5 of the valve body and which has opposite sides thereof provided with guides 6. The valve body also includes seat rings 7 and 8 removably supported substantially concentrically of the passage 3 on opposite sides of the recess 4 in such manner that the seating faces 9 are disposed in converging planes to form a substantially wedge-shaped pocket 10 for the gate or disk member 11 of the valve, as in customary gate valve construction.

The body of the valve may be provided with flanges 12 or other means whereby it may be connected between two adjacent sections of pipe (not shown), to conduct fluid through the passageway 3 of the valve. The neck 5 is provided with a laterally extending flange 13 seating a flange 14 of a bonnet 15 that is secured thereto in covering relation with the recess 4 by fastening devices 16 extending through the flanges 13 and 14. The bonnet 15 includes an upwardly extending bracket 17 having a tubular neck portion 18 carrying a horizontal top or shelf 19. Extending axially through the neck 18 and shelf 19 is a bore 20 conforming in diameter to that of a stem 21 which projects therethrough and connects with the disk or gate 11. The bore 20 has a counterbore 22 in the upper end thereof to receive a packing element 23 that is pressed into sealing engagement with the stem 21 by a gland 24. The gland 24 is of a length to project above the upper surface of the shelf portion 19 and is provided with laterally extending slotted ears 25 and 26 for accommodating the shanks 27 of swing bolts 28 anchored to outwardly projecting ears 29 on the bracket of the bonnet. The shanks of the bolts are provided with nuts 30 to draw the gland 24 into contact with the packing element 23.

The gate or disk 11 has grooved sides 31 engaging the guides 6 and has circumferential faces 32 and 33 disposed in planes parallel with the planes of the seating faces 9 of the seat rings 7 and 8. The gate 11 may be secured to the stem 21 in any suitable manner so that when the stem is reciprocated through the packing gland 24 the gate is moved to and from closed and open positions relative to the passageway 3, the guides being provided to support the gate and prevent slapping thereof against the seat ring faces 9 under action of the fluid flowing through the valve as the gate is being moved thereacross.

With the exception of the valve stem, the valve structure thus far described is illustrative of any standard gate valve and specifically forms no part of the present invention, the invention being to provide a gate actuating mechanism therefor whereby the gate may be moved under mechanical power as now to be described.

Supported upon the shelf portion 19 of the bracket 17 on the valve bonnet 15 is a plate 34, having ends 35 and 36 extending laterally and downwardly over sides of the shelf and terminating in sleeve-like rings 37 and 38 interconnected by tie bars 39 and 40 disposed along sides of the valve bonnet 15 at the ends of the shelf portion 19 of the bracket 17, as shown in Figs. 1, 2 and 4. The plate 34 is provided with an opening 41 for projection of the packing gland therethrough and is secured to the bracket by fastening devices, such as machine screws 42, that extend through suitable openings in the plate and into threaded sockets in the shelf portion of the bracket. Suspended in the sleeves 37 and 38 are cylinders 43 and 44 having heads 45 and 46 threaded onto the upper ends of the cylinders, as in Fig. 5, and having runs or shoulder portions 47 engaging the upper faces of the supporting sleeves 37 and 38. The heads 45 and 46 have openings 48 for passing piston rods 49 and 50 therethrough, the openings being counterbored to provide packing recesses 51 containing packing elements 52, the packing being retained in sealing relation with the rods by glands 53 that are threaded into the counterbores as shown in Fig. 5. The cylinders 43 and 44 project downwardly along sides of the valve with the axes thereof parallel with the axis of the valve stem 21 and the lower ends are threaded and closed by heads 54 and 55.

Slidably mounted in the respective cylinders are pistons 56 and 57 having connection with the rods 49 and 50 respectively. The upper ends of the rods have eyes 58 engaging in slotted ends 59 of a cross-yoke 60 and pivotally secured therein by pins 61 extending through the slotted ends of the yoke and through the openings of the eyes 58, as shown in Fig. 3. The central portion of the yoke 60 is adjustably connected to the valve stem by a sleeve portion 62 provided with a bore 63 for passing a threaded end 64 of the stem 21 which is anchored therein by jam-nuts 65 and 66 engaging the upper and lower ends of the sleeve 62, as shown in Fig. 3.

The cylinders 43 and 44 are of sufficient length so that the travel of the pistons 56 and 57 corresponds to the necessary movement of the gate 11. In order to effect movement of the pistons 56 and 57 in the cylinders and corresponding movement of the gate 11, the respective ends of the cylinders 43 and 44 are provided with connections for alternately supplying pressure fluid thereto, preferably a liquid, to act on the respective sides of the pistons 56 and 57. The upper ends of the cylinders 43 and 44 are, therefore, interconnected by a pipe 67 extending above and parallel with the tie bar 40 and having L's on the ends thereof connected with ports in the heads 45 and 46 of the cylinders 43 and 44, the liquid being admitted to and discharged from the head 45 through a port 68 having connection with a supply pipe 69 which connects with a port 70 of a four-way valve 71. The lower ends of the cylinders are interconnected by a pipe 72, one end being connected with a port in the head 55 which opens directly into the lower end of that cylinder, and the other end is connected to a fitting 73 connected with a port 74 located in the head 54 and which connects with the cylinder 43 through a channel 75. Liquid is supplied to the lower pipe by way of a pressure booster 76 which is supplied with liquid through a pipe 77 having connection with another port 78 of the four-way valve 71, previously mentioned.

The pressure booster is illustrated as formed in the head 54, and includes a piston chamber 79 located in coaxial alignment with the cylinder 43 and having a booster piston 80 slidable therein under influence of the liquid admitted through the pipe 77 by way of a port in the bottom of the chamber 79. Connected with the piston 80 and reciprocable in a smaller cylindrical chamber 81 which connects the chamber 79 with the lower end of the cylinder 43 and with the cylinder 44 through the channel 75, port 74 and pipe 72, is a ram 82 of substantially smaller diameter than the pistons to act on the liquid trapped between the end of the ram and the pistons 56 and 57, whereby the pressure acting on the larger area of the piston 80 is transmitted in a multiplied amount to the pistons 56 and 57, the increase being determined by the relative area of the piston 80 and ram 82 as compared to the relative area of the ram 82 and the combined areas of the pistons 56 and 57.

Extending laterally from the chamber 79 and adapted to be valved by the piston 80 is a port 83 having connection with the fitting 73 through a check valve 84. Liquid is passed from the upper end of the booster piston chamber 79 through a port 85 and from the ram chamber through a connecting port 86 to a pipe 87 which is connected with another port 88 of the four-way valve 71, previously mentioned. The pipe 87 also connects with the source of liquid pressure supply through a connecting pipe 89. The other port 90 of the four-way valve connects with the source of pressure supply through a pipe 91 and wherefrom fluid is admitted under pressure to the respective upper and lower ends of the cylinders 43 and 44 depending upon the position of the core 92 of the four-way valve 71, the core 92 of the valve 71 being provided with passageways 93 and 94 arranged to connect the port 90 with the port 70 or the other port 88 with the port 78 and the port 88 with the port 70, or the port 90 with the port 78.

Assuming that the power actuating mechanism thus described is connected with the valve as shown, and assuming that the gate or disk 11 is closed and in wedging engagement with the seat rings 8 and 9 and that the gate is to be opened, it is obvious that since the gate is wedged in sealing engagement with the seat rings, a greater amount of power is necessary in breaking the disk free from the seats than is required to complete the opening movement thereof and in accordance with the present invention the structure described effects a relatively slow initial movement followed by a more rapid opening movement of the gate with a maximum pull exerted on the stem during the initial slow movement and less pull during the subsequent movement. With the valve disk in closed position and the parts as shown in Fig. 3, liquid fills both cylinders 43 and 44 on the respective sides of the pistons 56 and 57, including all of the ports and piping, as well as the chamber, so that there is a solid liquid connection between the ram 82 and the pistons 56 and 57.

To open the gate, the core 92 of the four-way valve 71 is set as shown in Fig. 5 so that liquid under pressure is delivered to the lower end of the piston chamber 79 of the booster 76 by way of the port 90, core passage 93, port 78, and pipe 77 to act on the lower face of the booster piston 80 and effect upward movement thereof to move the ram 82 in the ram chamber 81. The ram 82 thus exerts an increased pressure on the liquid trapped between the ram 82 and the respective lower faces of the pistons 56 and 57. For example, the force exerted by the booster piston 80 on the ram is the pressure of the liquid multiplied by the area of the piston. This force is exerted by the ram on the pistons 56 and 57 so that the force acting on the gate is the ratio of the areas of the pistons 56 and 57 to the area of the ram multiplied by the force of the ram. Therefore, the pressure of fluid acting upon the pistons 56 and 57 is multiplied to give ample power for unseating the gate. By this time the lower end of the booster piston 80 has uncovered the port 83 so that pressure of the supplied liquid acts through the check valve 84 and connections of the pipe 72 directly upon the pistons 56 and 57 to move them at greater speed, although with a less power, but which is sufficient to continue opening movement of the gate.

During upward movement of the pistons 56 and 57 liquid is being displaced from the upper ends of the cylinders 43 and 44 through the pipe 69, and is returned to the source of supply through the ports 68, 70, 88, and pipe 89. The liquid trapped between the upper end of the booster piston 80 and the upper portion of the piston chamber 79 is displaced through the port 85 and pipe 87 to the source of supply. When the gate is open, the four-way valve core 92 is set to close all of the ports thereof to trap liquid on the respective ends of the pistons 56 and 57 to support the disk or gate of the valve in open position.

When it is desired to close the disk or gate of the valve, the core 92 of the four-way control valve is set so that the port 88 connects with the port 78 and the port 70 connects with the port 90. Liquid under pressure is then being admitted to the upper end of the cylinder 43 through the pipe 69 and to the upper end of the cylinder 44 through the connecting pipe 67 to act on the upper ends of the pistons 56 and 57 to cause them to move downwardly in their cylinders carrying the gate to closed position. During downward movement of the pistons liquid is displaced from the lower end of the cylinder 44, through the pipe 72, port 74 and channel 75 to the cylinder 43, and from the cylinder 43 through the ram chamber 81 to move the ram 82 downwardly and uncover the port 86, whereupon the liquid in the lower ends of the cylinders is then returned to the source of supply by way of the pipe 89. The liquid in the lower end of the booster piston chamber 79 is discharged through the port in the bottom of the chamber, the pipe 77 and ports 78 and 88 to the pipe 89. It is thus obvious that the power exerted to close the gate is that effected by the pressure of the liquid supply acting upon the upper ends of the pistons 56 and 57 which force is less than that utilized in completing the opening movement because of displacement of the piston rods 49 and 50, therefore the gate is not jammed into its seat but is moved firmly therein to effect a seal without distorting the seat rings or damaging the facing surfaces thereof.

From the foregoing it is obvious that I have provided a power mechanism well suited to the operation of gate valves since the power has been greatly increased when power is needed and then automatically reduced to avoid waste of power and injury to the valve. It is further obvious that with an actuating mechanism thus described, the gate may be actuated in quick time and with less power thereby adapting the invention to multiple valves which must be operated simultaneously or in rapid sequence as required in many processes employing gate valves.

What I claim and desire to secure by Letters Patent is:

1. In combination with a gate valve having a gate movably mounted in the valve for movement to and from a position closing flow through the valve, a cylinder member associated with the valve, a piston member in the cylinder member, means connecting one of said members with the gate, means supporting the other member in substantially fixed position relative to the valve, fluid pressure supply means connected with the respective ends of the cylinder, valve means connected with said supply means for selectively directing flow of the pressure fluid to one and the other ends of the cylinder to effect actuation of the member having connection with the gate for moving the gate to and from said closed position, and fluid pressure multiplying means connected in the fluid supply means to one end of the cylinder and responsive to flow of the pressure fluid to that end of the cylinder for increasing the pressure of said fluid on the movable member at the starting movement of said gate from closed position.

2. In combination with a gate valve having a gate movably mounted in the valve for movement to and from a position closing flow through the valve, a cylinder member associated with the valve, a piston member in the cylinder member, means connecting one of said members with the gate, means supporting the other member in substantially fixed position relatively to the valve, pressure fluid supply means connected with the respective ends of the cylinder, valve means connected with said supply means for selectively directing flow of the pressure fluid to one and the other ends of the cylinder to effect actuation of the member having connection with the gate for moving the gate to and from said closed position, a booster piston chamber interposed in the pressure fluid supply to one end of the cylinder, a booster piston in said chamber and closing said pressure fluid supply to the cylinder in one position of said booster piston, and a ram connected with the booster piston and arranged to act upon pressure fluid in said end of the cylinder to increase pressure on the pressure fluid in the cylinder until the booster piston moves from said closing position.

3. In combination with a gate valve having a gate movably mounted in the valve for movement to and from a position closing flow through the valve, a cylinder member associated with the valve, a piston member in the cylinder member, means connecting one of said members with the gate, means supporting the other member in substantially fixed position relative to the valve, pressure fluid supply means connected with the respective ends of the cylinder, valve means connected with said supply means for selectively directing flow of the pressure fluid to one and the other ends of the cylinder to effect actuation of the member having connection with the gate for moving the gate to and from said closed position, a booster piston chamber interposed in the fluid pressure supply to one end of the cylinder, a booster piston in said chamber and closing said fluid pressure supply to the cylinder in one position of said booster piston, a ram connected with the booster piston and arranged to act upon pressure fluid in said end of the cylinder to increase pressure on the pressure fluid in the cylinder until the booster piston moves from said closing position, and a check between the booster piston chamber and the cylinder for preventing back flow of the pressure fluid from said end of the cylinder.

4. In combination with a gate valve having a gate movably mounted in the valve for movement to and from a position closing flow through the valve, a cylinder member associated with the valve, a piston member in the cylinder member, means connecting one of said members with the gate, means supporting the other member in substantially fixed position relative to the valve, pressure fluid supply means connected with the respective ends of the cylinder, valve means connected with said supply means for selectively directing flow of the pressure fluid to one and the other ends of the cylinder to effect actuation of the member having connection with the gate for moving the gate to and from said closed position, a booster piston chamber interposed in the pressure fluid supply at one end of the cylinder, a booster piston in said chamber and closing said pressure fluid supply to the cylinder in one position of the booster piston, a ram connected with the booster piston and arranged to act upon pressure fluid medium in said end of the cylinder to increase pressure on the pressure fluid in the cylinder until the booster piston moves from said closing position, return means separate from the supply means for returning pressure fluid from between the booster piston and the ram when pressure fluid is admitted to the opposite end of said cylinder, and a check valve between the booster piston chamber and the cylinder member for preventing back flow of fluid from said end of the cylinder.

5. In combination with a gate valve having a gate movably mounted in the valve for movement to and from a position closing flow through the valve, a cylinder member associated with the valve, a piston member in the cylinder member, means connecting one of said members with the gate, means supporting the other member in substantially fixed position relative to the valve, pressure fluid supply means connected with the respective ends of the cylinder, valve means connected with said supply means for selectively directing flow of the pressure fluid to one and the other ends of the cylinder to effect actuation of the member having connection with the gate for moving the gate to and from closed position, a booster piston chamber interposed in the pressure fluid supply to one end of the cylinder and having connection therewith through a ram chamber, a booster piston in said chamber and closing said pressure fluid supply to the cylinder in one position of said booster piston, a ram in the ram chamber and connected with the booster piston and arranged to act upon pressure fluid in said end of the cylinder to increase pressure on the pressure fluid in the cylinder until the booster piston moves from said closing position, and a return duct connected with the ram chamber and valved by the ram when the booster piston moves from valving position.

6. In combination with a gate valve having a gate movably mounted in the valve for movement to and from a position closing flow through the valve, a bonnet and a stem connected with the gate and reciprocable through the bonnet, cylinders supported by the bonnet on opposite sides of the valve, pistons in the cylinders, rods connected with the pistons, a yoke connecting the rods, means connecting the yoke with said stem, pressure fluid supply means connected with the respective ends of the cylinders, valve means connected with said supply means for selectively directing flow of the pressure fluid to one and the other ends of the cylinders to effect actuation of the pistons for moving the gate to and from said closed position, a booster piston chamber interposed in the pressure fluid supply and connected with an end of one of the cylinders through a ram chamber, a booster piston in said booster piston chamber and closing said pressure fluid supply to said cylinders in one position of said booster piston, a ram in the ram chamber having connection with the booster piston and arranged to act upon pressure fluid in said ends of the cylinders for increasing pressure on the pressure fluid in the cylinders until the booster piston moves from said closing position, and a return duct connected with the ram chamber and valved by the ram when the booster piston moves from valving position.

7. An operating unit for a valve including a cylinder member, a piston member in the cylinder, pressure fluid supply means connected with the respective ends of the cylinder member to effect reciprocation of one of said members relative to the other, a booster piston chamber interposed in the pressure fluid supply to one end of the cylinder, a booster piston in said chamber and closing said pressure fluid supply to the chamber in one position of said booster piston, a ram connected with the booster piston and arranged to act upon the pressure fluid in said end of the cylinder to increase pressure on the pressure fluid in the cylinder until the booster piston moves from said closing position, and a check between the booster piston chamber and the cylinder for preventing flow of pressure fluid from said end of the cylinder.

8. An operating unit for a valve including a cylinder member, a piston member in the cylinder, pressure fluid supply means connected with the respective ends of the cylinder member to effect reciprocation of one of said members relative to the other, a booster piston chamber interposed in the pressure fluid supply to one end of the cylinder, a booster piston in said chamber and closing said pressure fluid supply to the chamber in one position of said booster piston, a ram connected with the booster piston and arranged to act upon the pressure fluid in said end of the cylinder to increase pressure on the pressure fluid in the cylinder until the booster piston moves from said closing position, a check between the booster piston chamber and the cylinder for preventing flow of pressure fluid from said end of the cylinder, and return means separate from the supply means for returning pressure fluid from between the booster piston and the ram when pressure fluid is admitted to the opposite end of said cylinder.

9. A valve operating unit including a supporting member adapted to be positioned on the bonnet of a valve, cylinders depending from said supporting member, pistons in the cylinders, rods connected with the pistons, a yoke connecting the rods and adapted for connection with the actuating stem of said valve, means for supplying pressure fluid to the respective ends of the cylinders, a booster chamber, a booster piston in said chamber, and a ram connected with the booster piston and arranged to act on pressure fluid contained in one end of the cylinders, said piston closing supply of pressure fluid to that end of the cylinders in one position of the booster piston whereby the pressure fluid is adapted to actuate the ram for increasing the pressure in said ends of the cylinders and to open said pressure fluid supply to the cylinders whereby the pressure supply acts directly upon the pistons in the cylinders subsequent to said increase in pressure effected by the ram.

10. A valve operating unit including a supporting member adapted to be positioned on the bonnet of a valve, cylinders depending from said supporting member, pistons in the cylinders, rods connected with the pistons, a yoke connecting the rods and adapted for connection with the actuating stem of said valve, means for supplying pressure fluid to the respective ends of the cylinders, a booster chamber, a booster piston in said chamber, a ram connected with the booster piston and arranged to act on pressure fluid contained in one end of the cylinders, said piston closing supply of pressure fluid to that end of the cylinders in one position of the booster piston whereby the pressure fluid is adapted to actuate the ram for increasing the pressure in said ends of the cylinders and to open said pressure fluid supply to the cylinders whereby the pressure supply acts directly upon the pistons in the cylinders subsequent to said increase in pressure effected by the ram, and separate means for returning pressure fluid from said ends of the cylinders to the source of supply.

11. A valve operating unit including a supporting member adapted to be positioned on the bonnet of a valve, cylinders depending from said supporting member, pistons in the cylinders, rods connected with the pistons, a yoke connecting the rods and adapted for connection with the actuating stem of said valve, means for supplying pressure fluid to the respective ends of the cylinders, a booster chamber, a booster piston in said chamber, a ram connected with the booster piston and arranged to act on pressure fluid contained in one end of the cylinders, said piston closing supply of pressure fluid to that end of the cylinders in one position of the booster piston whereby the pressure fluid is adapted to actuate the ram for increasing the pressure in said ends of the cylinders and to open said pressure fluid supply to the cylinders whereby the pressure supply acts directly upon the pistons in the cylinders subsequent to said increase in pressure effected by the ram, a check between the booster piston chamber and the cylinders for preventing back flow of pressure fluid from said ends of the cylinders, and separate means for returning pressure fluid from said ends of the cylinders to the source of supply.

12. An operating unit for a valve having a valving member mounted in the valve for movement to and from position closing flow through the valve, said unit including a cylinder member adapted to be associated with the valve, a piston member in the cylinder, means for connecting one of said members with the valving member, means for supporting the other member in substantially fixed location relative to the valve, pressure fluid supply means connected with the respective ends of the cylinder, valve means connected with said supply means for selectively directing the flow of pressure fluid to one and the other ends of the cylinder to effect actuation of the member having connection with the valving member for moving the valving member to and from said closed position, and fluid pressure multiplying means connected in the pressure fluid supply means and responsive to flow of the pressure fluid for increasing the pressure of said fluid on the movable member at the starting movement of the valving member.

13. An operating unit for a valve including a cylinder member, a piston member in the cylinder member, means for supplying a pressure fluid medium to the respective ends of the cylinder member to effect reciprocation of one of said members relative to the other, a booster piston chamber interposed in the pressure fluid supply, a booster piston in said chamber and closing said pressure fluid supply to the chamber in one position of said booster piston, and a ram connected with the booster piston and arranged to act upon the pressure fluid to increase the pressure on the fluid in the cylinder until the booster piston moves from said closing position.

14. In combination, a main cylinder, a main plunger reciprocable in said cylinder, an intensifier associated with said main plunger and having a main area for advancing said intensifier and an intensifying area for displacing fluid at an intensified pressure to said main plunger to move the same in a predetermined direction, conduit means for conveying pressure fluid from a fluid source to the main area of said intensifier to actuate the same, means adapted automatically in response to a predetermined movement of said intensifier to make the latter ineffective, and means responsive to a predetermined travel of said intensifier for establishing fluid connection between said conduit means and an effective area of said main plunger to convey pressure fluid thereto for causing said main plunger to continue its movement in said predetermined direction.

15. An operating unit including a cylinder member, a piston member in the cylinder, pressure fluid supply means connected with the respective ends of the cylinder member to effect reciprocation of one of said members relative to the other, a booster piston chamber interposed in the pressure fluid supply to one end of the cylinder, a booster piston in said chamber and closing said pressure fluid supply to the cylinder in one position of said booster piston, and a ram connected with the booster piston and arranged to act upon the pressure fluid in said end of the cylinder to increase pressure on the pressure fluid in the cylinder until the booster piston moves from said closing position.

WALTER T. CALDWELL.

REFERENCES CITED

The following references are of record in the file of this patent:

UNITED STATES PATENTS

| Number | Name | Date |
| --- | --- | --- |
| 406,193 | Bellhouse | July 2, 1889 |
| 2,032,185 | Sciaky | Feb. 25, 1936 |
| 2,148,616 | Gruber | Feb. 28, 1939 |
| 1,187,946 | Vincent | June 20, 1916 |
| 1,949,071 | Van Patter | May 15, 1934 |
| 1,977,554 | Hall | Oct. 16, 1934 |
| 1,980,617 | Engel | Nov. 13, 1934 |
| 2,161,279 | Bowen | June 6, 1939 |
| 1,389,300 | Basche | Aug. 30, 1921 |
| 1,429,665 | Wood | Sept. 19, 1922 |